(12) United States Patent
Lim

(10) Patent No.: US 12,739,598 B2
(45) Date of Patent: Sep. 15, 2026

(54) TAG-BASED OBJECT LOCATION TRACKING SYSTEM

(71) Applicant: HOSEO UNIVERSITY ACADEMIC COOPERATION FOUNDATION, Chungcheongnam-do (KR)

(72) Inventor: Huhnkuk Lim, Daejeon (KR)

(73) Assignee: HOSEO UNIVERSITY ACADEMIC COOPERATION FOUNDATION, Chungcheongnam-do (KR)

( * ) Notice: Subject to any disclaimer, the term of this patent is extended or adjusted under 35 U.S.C. 154(b) by 304 days.

(21) Appl. No.: 18/433,611

(22) Filed: Feb. 6, 2024

(65) Prior Publication Data

US 2025/0039640 A1 Jan. 30, 2025

(30) Foreign Application Priority Data

Jul. 26, 2023 (KR) ........................ 10-2023-0097856

(51) Int. Cl.

| | |
|---|---|
| ***H04W 4/02*** | (2018.01) |
| ***G01S 19/13*** | (2010.01) |
| ***H04W 4/029*** | (2018.01) |
| ***H04W 60/04*** | (2009.01) |

(52) U.S. Cl.
CPC ............. *H04W 4/029* (2018.02); *G01S 19/13* (2013.01); *H04W 60/04* (2013.01)

(58) Field of Classification Search
CPC ......... G01S 19/13; H04W 4/02; H04W 4/029; H04W 4/80; H04W 60/04
See application file for complete search history.

(56) References Cited

U.S. PATENT DOCUMENTS

| | | | | |
|---|---|---|---|---|
| 2010/0279652 | A1* | 11/2010 | Sharp | G06F 9/4843 455/410 |
| 2011/0142016 | A1* | 6/2011 | Chatterjee | G06Q 30/02 370/338 |

FOREIGN PATENT DOCUMENTS

| | | | |
|---|---|---|---|
| KR | 10-1304806 | B1 | 9/2013 |
| KR | 10-1560200 | B1 | 10/2015 |
| KR | 10-2021-0030194 | A | 3/2021 |

OTHER PUBLICATIONS

"Find Galaxy Watch with smartphone (how to make sounds and track location)", (Blog web page), https://springit.tistory.com/72 , Apr. 11, 2022. (English machine translation is submitted herewith.).

(Continued)

*Primary Examiner* — Nader Bolourchi
(74) *Attorney, Agent, or Firm* — The PL Law Group, PLLC

(57) ABSTRACT

A tag-based object location tracking system enables sharing the location of registered object tags with users within the same group. The tag-based object location tracking system can effectively provide a system that is capable of tracking the location of an object by attaching a tag to the object and sharing the location of the object with other users intended for sharing. The tag-based object location tracking system is advantageous in terms of preventing the loss of public items and managing location tracking in such a way as to locate the objects based on the location information acquired via a global positioning system (GPS) module, generate sound to help locate the object, and share the location of the tag with others.

4 Claims, 6 Drawing Sheets

(56) References Cited

OTHER PUBLICATIONS

"Comprehensive summary of 15 ways to track cell phone location and track the other person's cell phone location.", (Blog web page), https://sosohanlifetip.tistory.com/165, Apr. 21, 2022. (English machine translation is submitted herewith.).

"Kakao Talk location sharing, real-time display method", (Blog web page), https://lifetrevel.tistory.com/303, Jul. 29, 2020 English machine translation is submitted herewith.).

* cited by examiner

TAG-BASED OBJECT LOCATION TRACKING SYSTEM

CROSS-REFERENCE TO RELATED APPLICATION AND CLAIM OF PRIORITY

This application claims the benefit under 35 USC § 119 of Korean Patent Application No. 10-2023-0097856, filed on Jul. 26, 2023, in the Korean Intellectual Property Office, the entire disclosure of which is incorporated herein by reference for all purposes.

BACKGROUND

1. Field of the Invention

The present invention relates to a tag-based object tracking system, and more particularly, to a tag-based object location tracking system that shares the location of registered object tags with users belonging to the same group.

2. Description of the Related Art

The Internet of Things (IoT) is a technology that links various objects to the Internet through the integration of sensors and communication capabilities. Here, the objects include a wide range of embedded systems, such as appliances, mobile devices, and wearables. The IoT continues to develop as one of the key technologies of the Fourth Industrial Revolution.

Recently, various technologies and services related to location tracking systems have been introduced in the IoT market. The technology of location tracking systems is being researched, developed, and used in a variety of services while being broadly classified between smartphone-based location information provision technology and tag-based location tracking system technology. The essence of location tracking systems lies in real-time object tracking, and the burgeoning need for enhanced security in diverse industries, encompassing both personnel and assets, coupled with the rising popularity of Ultra-Wideband (UWB) technology-based solutions, fuels the explosive growth of the real-time location tracking system market.

Meanwhile, with the increasing demand for real-time locating systems (RTLS), the importance of location information sharing technology is being newly emphasized. The development of location-based services, which combine location information provision and social networking service (SNS) features, is actively underway, and various applications enabling the sharing of smartphone location information have been introduced.

While user location sharing features have been introduced in the field of smartphone-based location information provision, research and development in tag-based location tracking systems are currently centered mainly on confirming the location information of tags, with no concurrent development or application of location sharing features.

SUMMARY

To address such issues, the present invention aims to provide a tag-based object location tracking system capable of sharing the location of registered object tags with users belonging to the same group.

In order to solve the above objects, the tag-based object location tracking system of the present invention includes:

an object tag receiving GPS signal from global positioning system (GPS) satellites, acquiring tag location information from the received GPS signal, and transmitting the acquired tag location information to the outside via Bluetooth communication, a first user terminal receiving the tag location information from the object tag via Bluetooth communication and transmitting the tag location information to the outside to register the tag location information, a server connected to the first user terminal, receiving and storing the tag location information from the first user terminal, and generating and transmitting a registration request signal including the received tag location information, a database unit receiving the registration request signal from the server, extracting the tag location information from the registration request signal, and generating a tag sharing table with the extracted tag location information to register and store tag location information, and a second user terminal accessing the server, generating and transmitting a tag location information sharing signal to the server, and receiving the tag location information from the server to share the location of the object tag.

BRIEF DESCRIPTION OF THE DRAWINGS

FIGS. 5A to 6B are diagrams illustrating exemplary screen displays of a scenario demonstrating the tag location sharing feature according to an embodiment of the present invention.

DETAILED DESCRIPTION

In the entire specification, when a certain part is said to "include" certain components, this means that the part does not exclude other components but may include additional components, unless specifically stated otherwise.

The object location tracking system of the present invention provides a tag-based object location tracking and sharing system that provides location sharing function for registered tags.

The object location tracking system of the present invention provides a distinctive function by adding a group sharing feature for registered items in addition to the existing location tracking feature, enabling the location of registered tags to be shared with users belonging to the same group.

Therefore, the object location tracking system of the present invention is advantageous in managing public items or preventing the loss of objects through the sharing of object location information.

Figure 1:
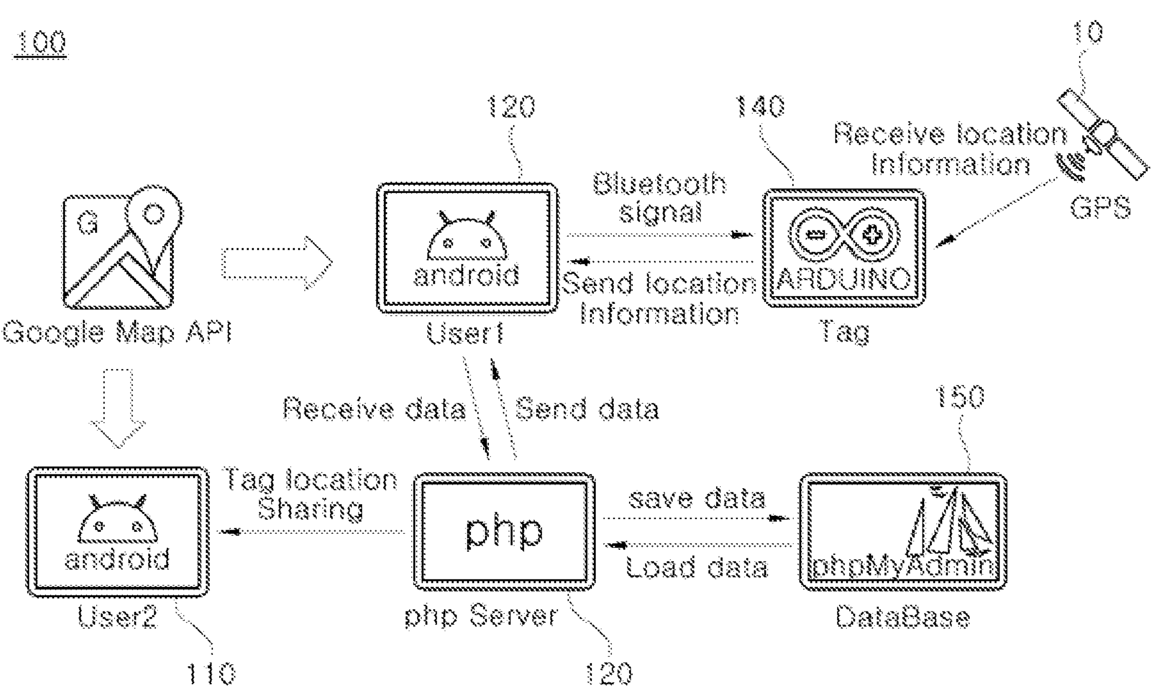
FIG. 1 is a diagram illustrating the concept of a tag-based object location tracking system according to an embodiment of the present invention.
Figure 2:
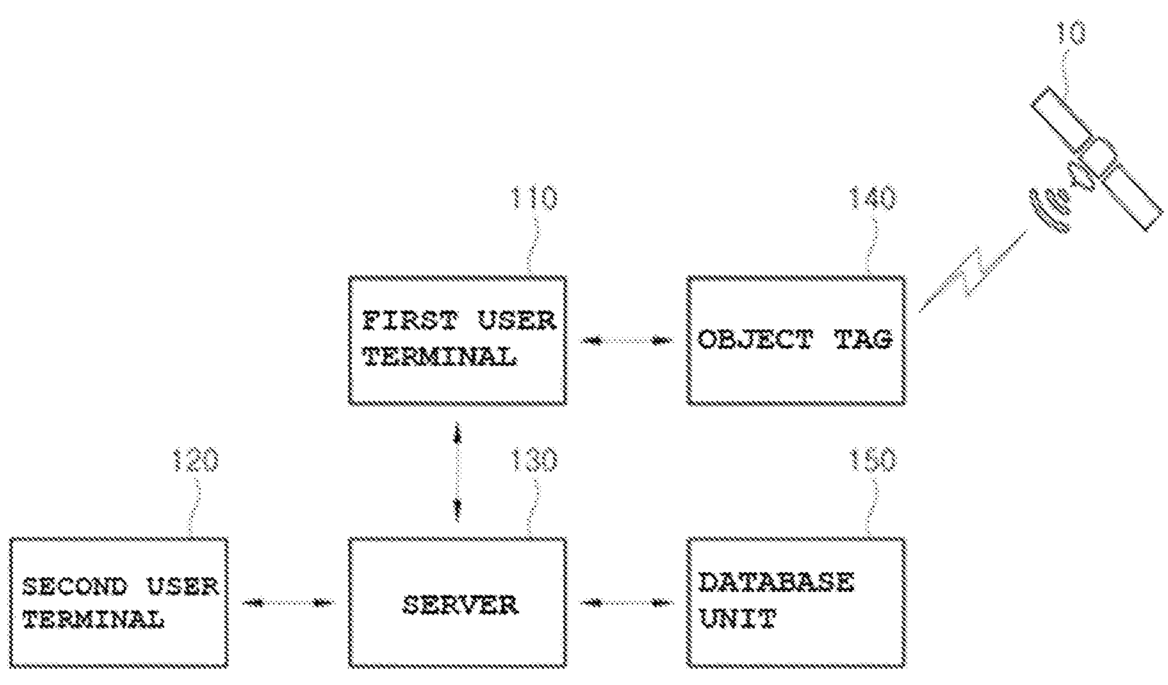
FIG. 2 is a diagram illustrating a configuration of a tag-based object location tracking system according to an embodiment of the present invention.

FIG. 1 is a diagram illustrating the concept of a tag-based object location tracking system according to an embodiment of the present invention, and FIG. 2 is a diagram illustrating a configuration of a tag-based object location tracking system according to an embodiment of the present invention.

The tag-based object location tracking system 100 according to an embodiment of the present invention includes a first user terminal 110, a second user terminal 120, a server 130, an object tag 140, and a database unit 150.

The first and second user terminals 110 and 120 may be electronic devices with embedded mobile applications to provide a user interface function for receiving and sharing the location of the registered object tag 140. For example, the electronic devices may include at least one of a smartphone, a tablet personal computer, a mobile phone, an e-book reader, a portable multimedia player (PMP), an MP3 player, a mobile medical device, a camera, or a wearable device (e.g., electronic glasses, electronic clothing, electronic bracelet, electronic necklace, electronic tattoo, or smartwatch). Preferably, the present invention may be implemented with a smartphone embedded with an Android app.

The first and second user terminals 110 and 120 connect to the server 130 through a mobile app, and the server 130 has a hardware configuration similar to a typical web server, web application server, or wireless application protocol (WAP) server. However, it may include a software program module implemented in any language, such as C, C++, Java, PHP, .Net, Python, or Ruby to perform various functions, and in this invention, it may be a PHP server.

The server 130 functions as a web server, and when connected with the first and second user terminals 110 and 120 through a web browser, may receive data requests from the first and second user terminals 110 and 120, perform processing through web programs such as JSP, PHP, etc. to generate responses corresponding to the requests, and then transmit to the web browser by converting the generated responses to XML or text files and transmitting the Document Object Model (DOM) by JavaScript without creating an HTTP page.

In addition, the server 130 is a computer system that is typically connected to an unspecified number of clients (including the first and second user terminals 110 and 120) and/or other servers through a network 101 such as open computer networks, e.g., the Internet, receives task requests from clients or other web servers, process them, and provide the corresponding task results, and computer software (server programs) installed therefor.

The object tag 140 is composed of a GPS module, a small speaker, and a Bluetooth module to perform the function of transmitting location information to a mobile app.

The GPS module may receive GPS signals from GPS satellites and obtain the coordinate values of the tag location information from the received GPS signals.

The object tag 140 receives real-time location information from GPS satellites 10 to determine the tag location information.

The object tag 140 transmits the received tag location information to the first user terminal 110 via Bluetooth communication to register the tag location information.

In another embodiment, the first user terminal 110 may be a user who receives tag location information from the registered object tag 140 through Bluetooth connection.

The first user terminal 110 may perform Bluetooth Low Energy (BLE) communication to wirelessly communicate with nearby object tags 140 and receive the tag location information of the object tag 140.

The second user terminal 120 may be a user who receives the tag location information of the registered object tag 140 from the first user terminal 110.

The first and second user terminals 110 and 120 may display the tag location information received from the object tag 140 on the map data via a map application program interface (API) of the mobile app.

The map API is software that enables communication between the first user terminal 110, the second user terminal 120, and the server 130 and can connect the mobile app with the server 130.

The map API provides various features to create services that utilize maps on websites and mobile apps.

The first and second user terminals 110 and 120 may display the location of the object tag 140 on the map data supported by the map API and verify the location of the registered object tag 140.

The server 130 is used to store and manage the tag location information of the object tag 140 collected from the mobile apps of the first and second user terminals 110 and 120 and performs the function of providing the tag location information of the registered object tag 140 to sharing recipients (e.g., the second user terminal 120).

For convenience of explanation, the first user terminal 110 is exemplified to transmit tag location information of the object tag 140 to the server 130 for registration, while the second user terminal 120 is exemplified to share the tag location information of the object tag 140 registered by the first user terminal 110.

Figure 3:
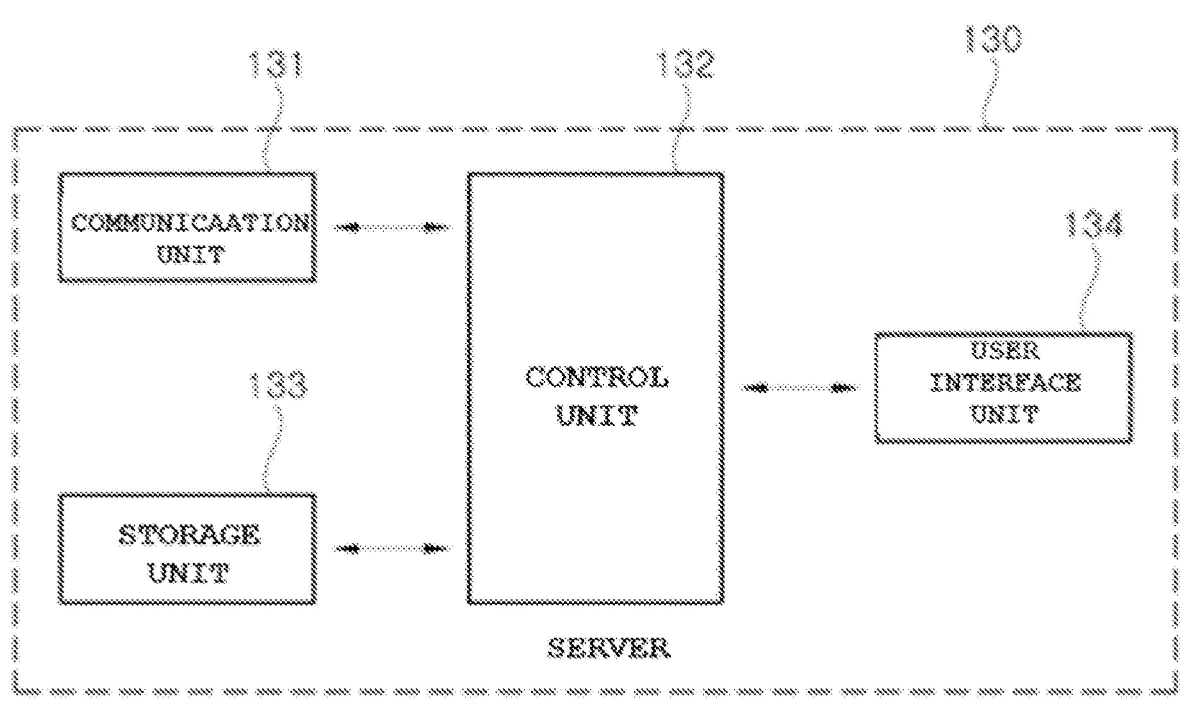
FIG. 3 is a schematic block diagram illustrating a configuration of a server according to an embodiment of the present invention.
Figure 4:
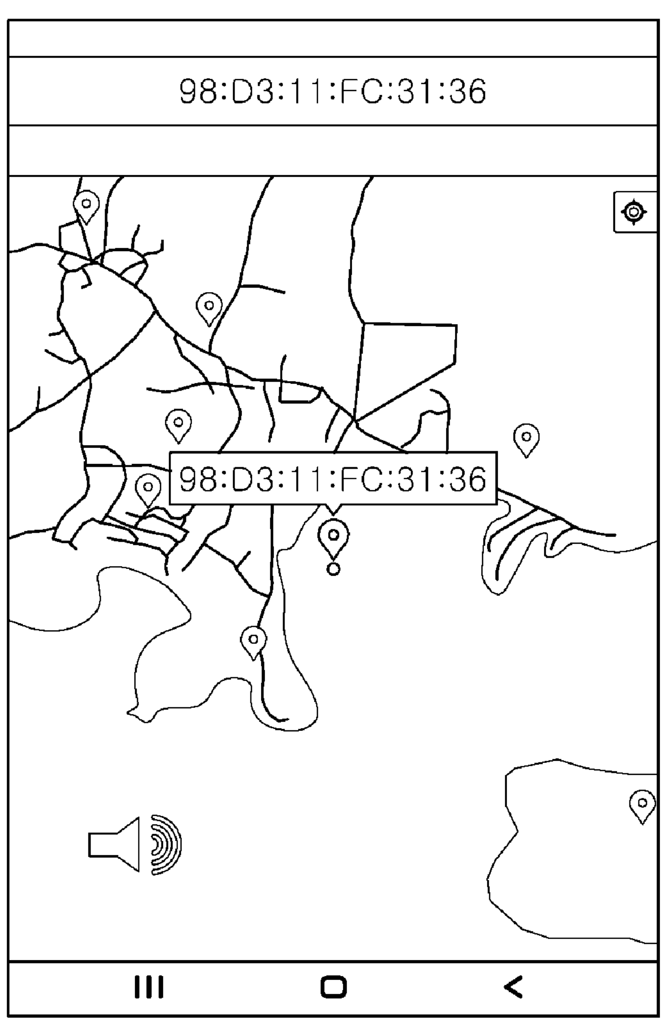
FIG. 4 is a diagram illustrating an exemplary screen display of a shared tag location information on a user terminal according to an embodiment of the present invention.

FIG. 3 is a schematic block diagram illustrating a configuration of a server according to an embodiment of the present invention, and FIG. 4 is a diagram illustrating an exemplary screen display of a shared tag location information on a user terminal according to an embodiment of the present invention.

According to an embodiment of the present invention, the server 130 includes a communication unit 131, a control unit 132, a storage unit 133, and a user interface unit 134.

The communication unit 131 provides a communication interface established through the mobile apps embedded in the first and second user terminals 110 and 120.

The control unit 132 may receive user membership information from the first and second user terminals 110 and 120 through the communication unit 131 and store the user membership information in the storage unit 133.

The control unit 132 may receive the tag location information of the object tag 140 from the first and second user terminals 110 and 120 through the communication unit 131 and store the tag location information in the storage unit 133.

The control unit 132 may temporarily store tag location information received from the first user terminal 110, generate a registration request signal including the received tag location information, and transmit it to the database unit 150.

The control unit 132 may generate information on the object tag 140 for registration and transmit the information to the database unit 150 to register the object tag information in the database unit 150.

When the first user terminal 110 and the second user terminal 120 sign up as user members through mobile app, the control unit 132, through the communication unit 131, may receive information about whether the first user terminal 110 and the second user terminal 120 are users sharing the location information of the object tag 140 or users receiving the shared location information of the object tag 140, and then store the relevant user information in the storage unit 133.

The present invention allows setting the user terminal sharing the location information of the object tag 140 as the first user terminal 110 and the user terminal receiving the shared location information of the object tag 140 as the second user terminal 120.

The control unit 132 transmits user membership information, information about registered object tags 140, information about users sharing the location information of the object tag 140, and information about users receiving the shared location information of the object tag 140 to the database unit 150.

The control unit 132 generates and transmits to the data base 150 a registration request signal including user membership information of the first user terminal 110 and the second user terminal 120, tag location information of the object tag 140, information about users sharing the location information of the object tag 140, and information about users receiving the shared location information of the object tag 140.

The database unit 150 may receive the registration request signal from the control unit 132, extract the user membership information of the user terminals 110 and 120, the tag location information about the object tag 140, the information about users sharing the location information of the object tag 140, and the information about users receiving the shared location information of the object tag 140 from the received registration request signal, and organize and register this information in a tag sharing table.

The control unit 132 may interwork with the database unit 150 to upload data, including the user membership information, the tag location information, the information about users sharing the location of the object tag 140, and the information about users receiving the shared location information of the object tag 140, from the tag sharing table, transmit the uploaded data to either the first user terminal 110 or the second user terminal 120, and update the data in the tag sharing table by transmitting data received from the first user terminal 110 or the second user terminal 120 to the database unit 150.

The aforementioned data may include the user membership information, the tag location information of the object tag 140, the information about users sharing the location of the object tag 140, and the information about users receiving the shared location information of the object tag 140.

The second user terminal 120 may access the server 130 to be provided with features of provision and sharing of the location (tag location information) of the registered object tag 140 from the server 130 interworking with the database unit 150.

The object tag 140 communicates with the mobile app of the first user terminal 110 and transmits the location information received from GPS satellites 10 to the first user terminal 110, and the first user terminal 110 registers and stores the tag location information received from the object tag 140 in the database unit 150 through the server 130.

As shown in FIGS. 1 and 2, the sharing user (the second user terminal 120) shares the tag location information of the object tag 140 stored in the database unit 150.

The method of sharing the location of the object tag 140 is as follows.

When a user (the first user terminal 110) intends to share the location information of an object tag 140 registered through a mobile app with another user (the second user terminal 120), the database unit 150, in response to a request from the control unit 132, stores the object tag ID and the ID of the other user, i.e., the second user terminal 120, attempting to share in the SHAREFRIEND table (tag sharing table) using the ID key of the second user terminal 120.

The control unit 132 may share the tag location information with the second user terminal 120 intended for sharing based on the data stored in the SHAREFRIEND table of the database unit 150. Subsequently, the shared tag is added to the list of tags in the user app that receives the shared tag location.

The user interface unit 134 may provide a graphic interface on the first user terminal 110 and the second user terminal 120 using the map API, the graphic interface displaying the tag location information received from the object tag 140 on the map data, under the control of the control unit 132.

As shown in FIG. 4, the control unit 132 uploads the object tag list from the SHAREFRIEND table in the database unit 150, and the user interface unit 134 generates and transmits a graphic interface displaying the object tag list on the map data to the first user terminal 110 and the second user terminal 120.

The first user terminal 110 and the second user terminal 120 generate a control signal that selects a tag from the tag list and transmit the control signal to the server 130.

The control unit 132 generates tag location information corresponding to the control signal, creates a graphic interface displaying the tag location information, including the object tag ID, on the map data through the user interface unit 134, and transmits the graphic interface to the first user terminal 110 and the second user terminal 120.

The first user terminal 110 and the second user terminal 120 display the tag location information on the map.

FIG. 4 shows a screen display for User2 (the second user terminal 120) where the location information of the tag registered and shared by User1 (the first user terminal 110) is displayed on the map.

In addition, the object tag ID registered and shared by User1 is displayed at the top of the screen.

A scenario is configured as follows to demonstrate the tag location sharing feature of the tag-based object location tracking system 100.

First, the object tag 140 transmits the location information of the tag received by the GPS module to the first user terminal 110 through the built-in Bluetooth module.

Upon receiving the tag location information, the first user terminal 110 displays the location of the tag on the map.

The mobile app of the first user terminal 110 transmits and stores the location of the tag to the database unit 150 through the server 130 via network communication.

When the database unit 150 shares the stored location information of the tag by adding a user in the mobile app of the first user terminal 110, the shared tag is added to the tag list of the sharing recipient on the second user terminal 120.

When the tag added in the list is clicked, the second user terminal 120 retrieves the location of the shared tag from the database unit 150 and displays the location on the screen of the mobile app of the shared user. In this manner, the object location tracking system 100 can provide the feature of sharing the location of tags. Results based on this scenario are described with reference to FIGS. 5A to 6B.

FIGS. 5A to 6B are diagrams illustrating exemplary screen displays of a scenario demonstrating the tag location sharing feature according to an embodiment of the present invention.

To implement the object location sharing feature, which is not present in the existing tag-based object location tracking system, the app provides a function for adding a friend and a function for managing added friends. By registering a tag and adding friends, it is possible to share the location of the registered tag with other users.

Figure 5A:
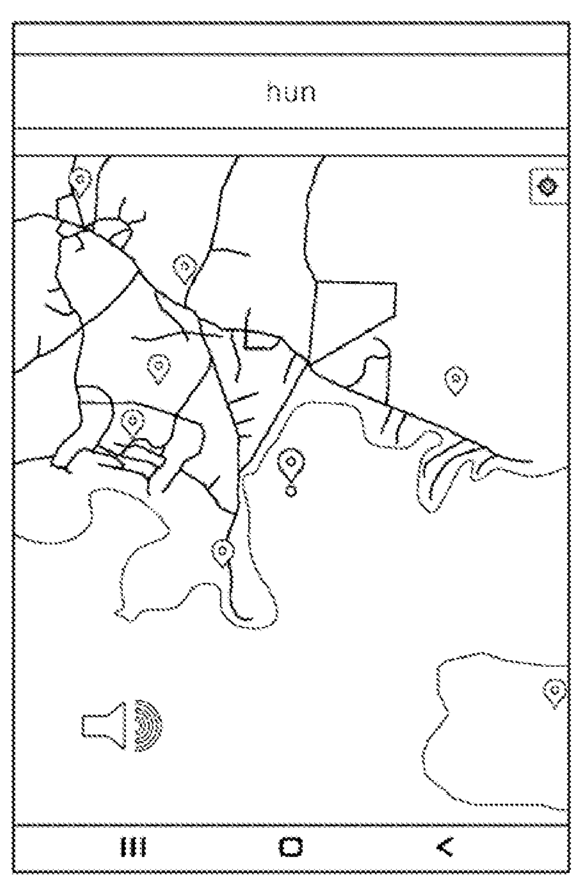

FIG. 5A represents a screen for a function of checking the location information of the tag and locating the tag through sound produced in response to clicking on a speaker icon. The screen has a map provided through the map API along with the speaker icon at the bottom of the screen, which, when pressed, transmits a Bluetooth signal prompting the tag to produce sound upon receiving the signal to assist finding the physical location of the object.

Figure 5B:
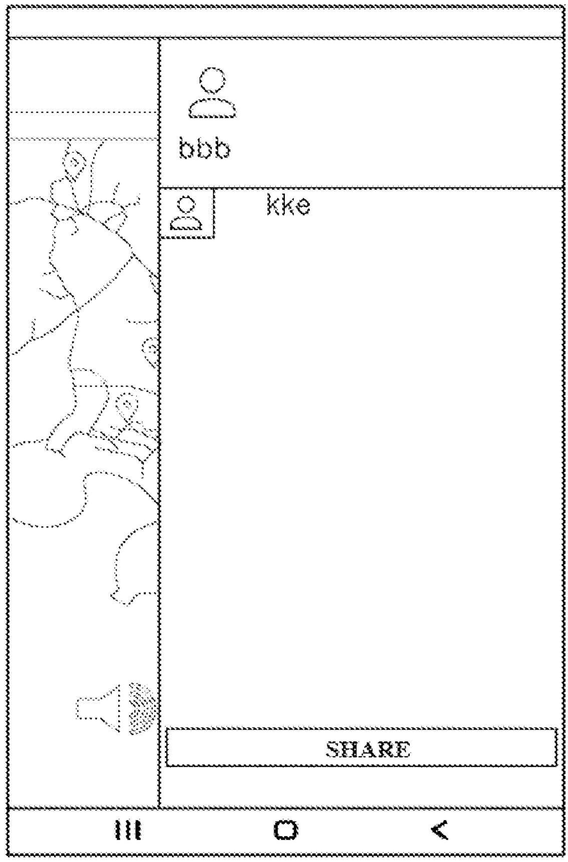

FIG. 5B represents a screen for a navigation drawer function allowing for checking the list of users to be shared with the location of a specific tag.

Figures 6A, 6B:
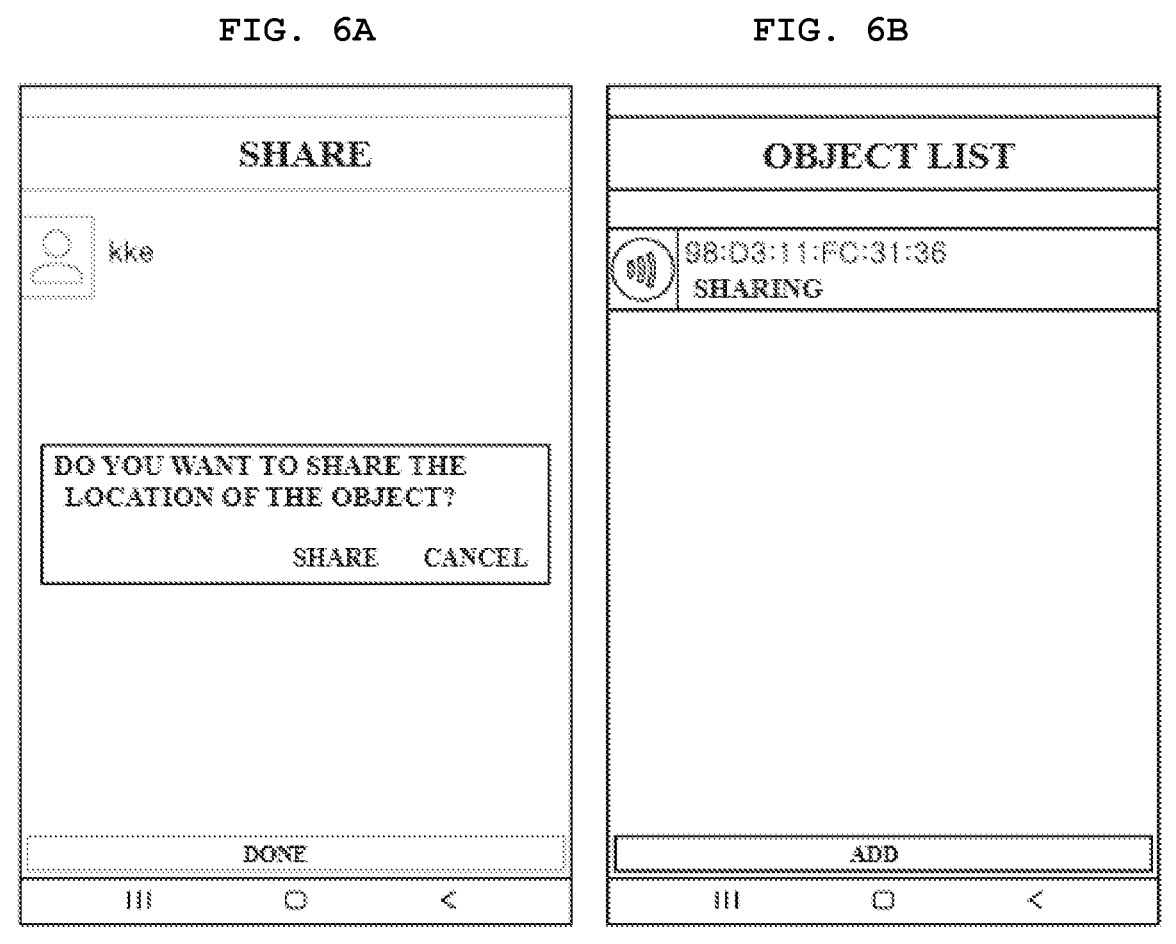

To actually share the location of the tag, the user needs to press the share button and navigate to the screen FIG. 6A, which is designed for sharing the location with other users. In the screen FIG. 6A, it is possible to select the friends to share with.

FIG. 6B represents a screen displaying a list of object tags on the mobile app of a sharing recipient.

By checking the tag list on the mobile app of the second user terminal 120 as a sharing recipient of the tag location, the presence of the added tag can be confirmed. By clicking on the tag, it may be possible to check the location of the shared tag, as shown in FIG. 4, but it is impossible to share it with anyone else.

The present invention provides a system that is capable of tracking the location of an object by attaching a tag to the object and sharing the location of the object with other users intended for sharing.

The present invention has been implemented to check the location of an object using location information obtained via a GPS module and generating sound to locate the object. In addition, the present invention is expected to contribute to preventing loss of public items and managing location tracking by introducing the features of sharing the location of a tag with others, which is distinctive from existing systems.

Although the embodiments of this invention have been described in detail above, the scope of this invention is not limited thereto, and various modifications and improvements of those skilled in the art using the basic concepts of this invention defined in the following claims also belong to the scope of this invention.

With the above-described configuration, the present invention can effectively provide a system that is capable of tracking the location of an object by attaching a tag to the object and sharing the location of the object with other users intended for sharing.

The present invention is advantageous in terms of preventing the loss of public items and managing location tracking in such a way as to locate the objects based on the location information acquired via a global positioning system (GPS) module, generate sound to help locate the object, and share the location of the tag with others.

While the present invention has been described with respect to the specific embodiments, it will be apparent to those skilled in the art that various changes and modifications may be made without departing from the spirit and scope of the invention as defined in the following claims.

What is claimed is:

1. A tag-based location tracking system comprising:

an object tag configured for receiving GPS signal from global positioning system (GPS) satellites, acquiring tag location information of the object tag from the received GPS signal, and transmitting the acquired tag location information to an external device via Bluetooth communication;

a first user terminal configured for receiving the tag location information from the object tag via Bluetooth communication and transmitting the tag location information to the external device to register the tag location information;

a server connected to the first user terminal, the server configured for receiving and storing the tag location information from the first user terminal, and generating and transmitting a registration request signal including the received tag location information;

a database unit configured for receiving the registration request signal from the server, extracting the tag location information from the registration request signal, and generating a tag sharing table with the extracted tag location information to register and store the tag location information; and a second user terminal configured for accessing the server, generating and transmitting a tag location information sharing signal to the server, and receiving the registration request signal from the server and extracting the tag location information of the object tag from the registration request signal to share the tag location of the object tag, wherein the server further comprises a control unit configured to receive, when the first user terminal and the second user terminal access for registration as user members, user information indicative of a user of the first user terminal that shares the tag location information of the object tag and a user of the second user terminal that receives the shared tag location information of the object tag and store in a storage unit, the control unit is configured to generate the registration request signal comprising user membership information of the first user terminal and the second user terminal, the tag location information of the object tag, information about users sharing the tag location information of the object tag, and information about the users receiving the shared tag location information of the object tag and transmit the registration request signal to the database unit, the database unit is configured to receive the registration request signal from the control unit and extract the user membership information, the tag location information of the object tag, the information about users sharing the tag location information of the object tag, and the information about the users receiving the shared tag location information of the object tag from the received registration request signal to register the extracted information in the tag sharing table, and the first and second user terminals are configured to provide a feature to check the location information of the object tag and locate the object tag through sound triggered by clicking on a speaker icon, configure a map provided through a map application programming interface (API), physically identify a location of the object through sound by receiving a Bluetooth signal when the speaker icon at the bottom of a screen is pressed, confirm a list of users for sharing the location of a specific tag through a navigation drawer function, navigate to the screen for sharing the location with other users in response to pressing a sharing button, select a friend to be shared from the screen, confirm the presence of a tag added to a tag list when checking the tag list in a mobile application of the second user terminal with which the location of the object tag is shared, confirm the location of the shared tag when the added tag is clicked, provide a function for adding a friend and a function of managing friends to implement object location sharing function, and share the location of the registered tag with other users when the object tag is registered and a friend is added.

2. The tag-based location tracking system of claim 1, wherein the control unit is configured to manage the tag location information through interworking with the database unit by updating data received from the first user terminal or the second user terminal in the tag sharing table or by uploading data stored in the tag sharing table and transmitting to the first user terminal or the second user terminal.

3. The tag-based location tracking system of claim 1, wherein the database unit is configured to, in response to a request from the control unit, store an object tag identifier (ID) and an ID of another user in the tag sharing table, using an ID key of the second user terminal attempted sharing, and the control unit is configured to, based on the data stored in the SHAREFRIEND table of the database unit, transmit the tag location information to the second user terminal to be shared, the shared tag being added to the tag list of the mobile application of a user receiving shared tag location.

4. The tag-based location tracking system of claim 1, wherein the first user terminal and the second user terminal are configured to generate a control signal that selects a tag on the tag list and transmit to the server, and the control unit is configured to generate the tag location information corresponding to the control signal, create a graphic interface displaying the tag location information, including the object tag ID, on map data through a user interface, and transmit the graphic interface to the first user terminal and the second user terminal.

* * * * *